United States Patent [19]

Ito et al.

[11] Patent Number: 5,243,830
[45] Date of Patent: Sep. 14, 1993

[54] AIR CONDITIONING APPARATUS FOR AN AUTOMOBILE

[75] Inventors: Koichi Ito, Kariya; Akihito Higashihara, Chiryu, both of Japan

[73] Assignee: Nippondenso Co., Ltd., Kariya, Japan

[21] Appl. No.: 853,198

[22] Filed: Mar. 18, 1992

[30] Foreign Application Priority Data

Mar. 19, 1991 [JP] Japan .................. 3-54899
Oct. 8, 1991 [JP] Japan .................. 3-260796

[51] Int. Cl.⁵ .............................................. F16K 31/32
[52] U.S. Cl. .................................. 62/344; 251/901
[58] Field of Search .............. 242/75, 67.4; 251/901; 62/244; 236/49.3

[56] References Cited

U.S. PATENT DOCUMENTS

| | | | |
|---|---|---|---|
| 3,317,157 | 5/1967 | Leiber | 242/75.5 |
| 4,875,635 | 10/1989 | Steltzer | 242/75.5 |
| 5,145,456 | 9/1992 | Ito et al. | 454/75 |

FOREIGN PATENT DOCUMENTS

6485809 3/1983 Japan .

OTHER PUBLICATIONS

U.S. Application No. 07/809,443.
U.S. Application No. 07/705,808.

Primary Examiner—Wiliam E. Tapolcal
Attorney, Agent, or Firm—Cushman, Darby & Cushman

[57] ABSTRACT

An air conditioning apparatus for an automobile in which a desired tension of a film damper is always maintained regardless of a movement of the film damper. A third shaft 14 is connected to a truncated conical-shaped first tapered pulley 21, and a fourth shaft 15 is connected to a truncated conical shaped second tapered pulley 22. The second film damper 18 is wound on the third and fourth shafts 14 and 15, and a second wire 20 is spirally wound onto the first and second tapered pulleys 21 and 22. The first and second tapered pulleys 21 and 22 are arranged such that they are oppositely tapered in such a manner that the amount of movement of the damper film 14 and the wire 20 is substantially equal, not only between the third shaft 14 as a drive shaft and the first pulley connected to the shaft 14, but also between the fourth shaft 15 as a driven shaft and the second pulley 22 connected to the shaft 15. Therefore, an excessive stretching and slackening of the damper film and the wire is prevented.

8 Claims, 12 Drawing Sheets

Fig. 5-(a)
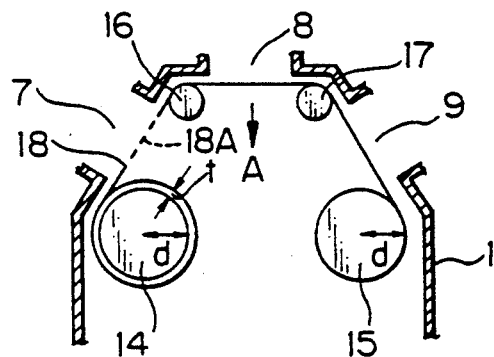
Fig. 5-(b)
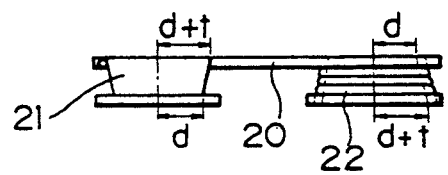
Fig. 5-(c)
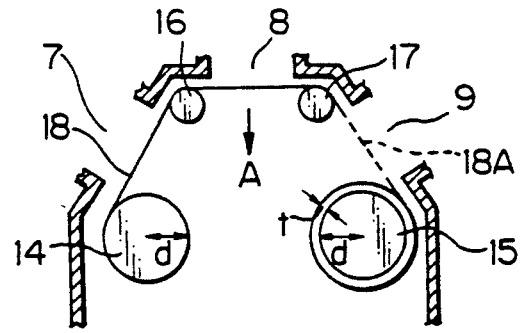
Fig. 5-(d)
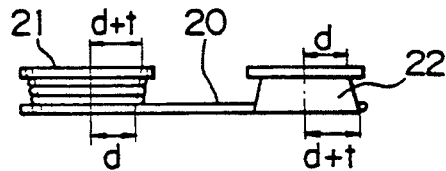

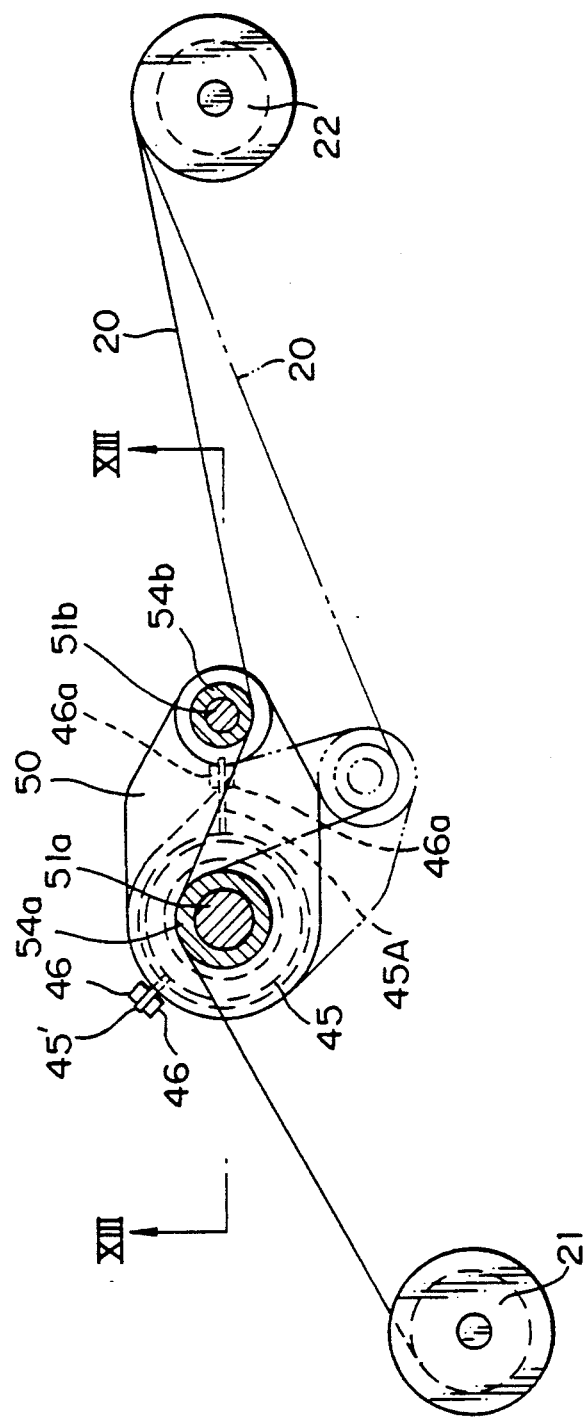

Fig. 14-(a)
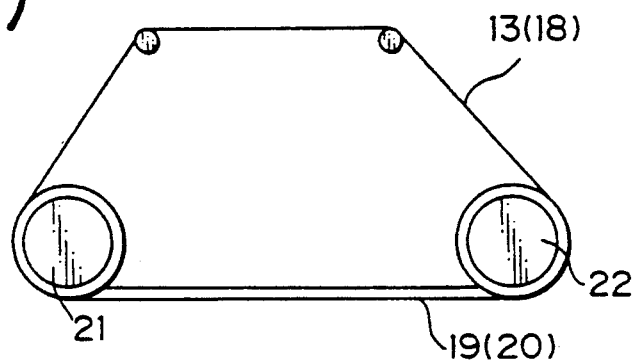
Fig. 14-(b)
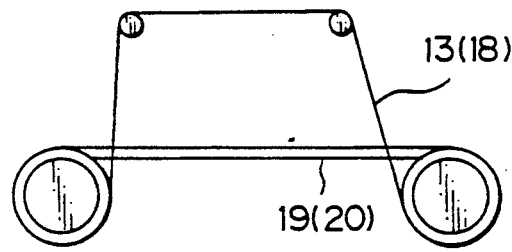
Fig. 14-(c)
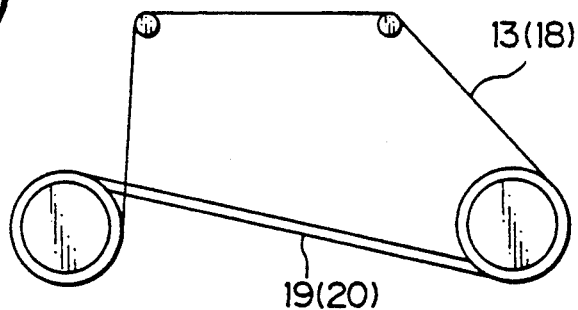
Fig. 14-(d)
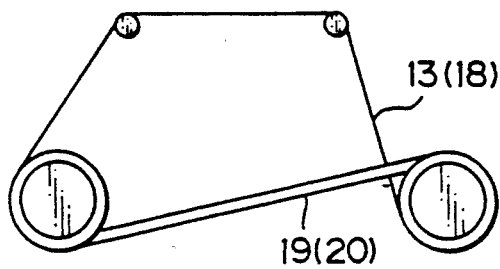

5,243,830

AIR CONDITIONING APPARATUS FOR AN AUTOMOBILE

BACKGROUND OF THE INVENTION

1. Field of the Invention

The present invention relates to an air conditioning apparatus wherein a direction of an air flow is controlled by a film member.

2. Description of the Related Art

An air conditioning apparatus wherein a film member is used for controlling a direction of a flow of air is disclosed in the Journal of Nippon Denso Technical Disclosures, published on Feb. 15, 1990.

In this prior art, a film member is used as a damper (film damper) to select an air outlet mode for introducing an air flow into a desired location of the cabin. The film damper has two ends, which are connected to separate shafts connected with each other by a belt moved by an electric motor. When the shafts are rotated, one of the ends of the damper is wound onto one of the shafts, and the other end of the damper is unwound from the other shaft, whereby an opening formed in the damper is aligned with a desired outlet to thereby obtain a desired air flow mode.

In the prior art, the amount of film member wound onto one of the shafts, and the amount of the film damper wound onto the other shaft are different, and depend on the outlet mode selected. This means that the entire outer diameter of the shaft on which a larger amount of the film damper is wound is larger than that of the shaft on which a smaller amount of the film damper is wound.

In the prior art construction wherein two shafts are driven by the same belt, these shafts are rotated at the same rotational speed, but the difference in the total diameters, including the thickness of the film wound thereon of the two shafts, may cause the speed of the film wound up or fed by one of the shafts to differ from the speed of the film fed by or wound up on the other shaft, and thus the film moving between the shafts is overstretched or becomes too slack. The overstretching or slackening of the film member makes an opening in the film member out of register, i.e. to be misaligned, and thus problems arise in that a noise is generated or a leakage of air occurs.

SUMMARY OF THE INVENTION

An object of the present invention is to provide an air conditioning apparatus capable of obtaining the same amount of film fed by or wound up on the two shafts, regardless of any difference in the amount of film wound on each of the two shafts.

According to the present invention, to attain this object, an air conditioning apparatus for an automobile is provided, the apparatus comprising:

an air duct having one end open to a cabin of the automobile, for generating a flow of air to be introduced into the cabin;

said air duct defining a air of opposing walls between which a flow of air passes;

a blower arranged in the air duct, for generating a flow of air in the air duct;

means arranged downstream of the blower for controlling a temperature of the air flow, and;

damper means arranged in the air duct for controlling a condition of the air flow in the air duct, said damper means comprising:

a pair of spaced-apart shafts each having an axis, and being rotatably with respect to said opposing walls of the air duct;

a film member having a first end connected to one of said shafts and a second end connected to another of said shafts, said film member having at least one opening through which the air in the air duct is passed, for controlling a condition of the flow of the air in the air duct and having first portion wound on the one of said shafts and second portion wound on the other of said shafts;

drive means for imparting a rotational movement to said one shaft in such a manner that the film member is moved between said spaced-apart shafts by winding or unwinding the film member onto or from said one shaft to which the drive means are connected, and;

power transmitting means for transmitting the rotation from said one shaft connected to the drive means to the other shaft in such a manner that the rotational speed of each of the shafts if changed in accordance with a radius of the first portion of said film member and a radius of the second portion of said film member.

According to the present invention, in accordance with the radius of each of the winding shafts, the rotational speed of each of the winding shafts is changed by the power transmitting means in such a manner that the rotation of the one shaft causes the film member to be wound up or to be unwound for a length equal to the length of the film unwound or wound up be the other shaft. As a result, an excessive slackening or stretching of the film is prevented, and thus a desired position of the film member is obtained for controlling the condition of the flow of air, to thereby effectively suppress a generation of noise when air is emitted into the cabin via a selected outlet, and to maintain a desired temperature of the air inside the cabin.

According to another aspect of the present invention, an air conditioning apparatus for an automobile is provided, the apparatus comprising:

an air duct having one end open to a cabin of the automobile, for generating a flow of air to be introduced into the cabin;

said air duct defining a pair of opposing walls between which the flow of air passes;

a blower arranged in the air duct, for generating a flow of air in the air duct means arranged downstream of the blower for controlling the temperature of the air flow, and;

damper means arranged in the air duct for controlling a condition of the air flow in the duct, said damper means comprising:

a pair of spaced-apart shafts each having an axis extending transverse to said opposing walls of the air duct, and being rotatably supported by said opposing walls of the air duct;

a film member having a first end fixedly connected to one of said shafts and a second end connected to the other of said shafts;

said film member having at least one opening through which the air in the air duct is passed, for controlling a condition of the flow of air in the air duct;

a first rotating body connected to said one shaft and rotating in the same directions as said one shaft, the first rotating body having an axis coaxial with said one shaft and defining an outer surface having a radius the value of which varies proportionally along the axis thereof;

a second rotating body connected to the other shaft and rotating in the same direction as the other shaft, the second rotating body having an axis coaxial with the other shaft and defining an outer surface having radius the value of which varies proportionally along the axis thereof;

a wire member having a first end connected to the first rotating body such that the wire member is able to be helically wound on said outer surface of the first rotating body, and a second end connected to the second rotating body such that the wire member is able to be helically wound on said outer surface of the second rotating body, and;

means for generating a resilient frictional force on the wire moving between the first and second pulleys, to thereby provide a desired tension in the wire, for obtaining a desired engagement of the wire with the first and second pulleys.

The provision of the resilient frictional force generating means can maintain a desired tension in the wire even when the air duct is subjected to a thermal shrinkage due to the change in seasons, which effectively prevents the wire from being displaced from the desired spiral state thereof on the first or second surface of the first or second rotating body, and further prevents the wire from being detached from the first and second rotating bodies.

BRIEF DESCRIPTION OF THE DRAWINGS

FIG. 5-(a) is a schematic side elevational view of the third and fourth shafts with a film damper wound thereon, when the film damper is in the foot outlet mode;

FIG. 5-(b) is a top view of the first and second pulleys taken along the line A in FIG. 5(a);

FIG. 5-(c) is a schematic side elevational view of the third and fourth shafts with a film per wound thereon, when the film damper is in the face outlet mode;

FIG. 5-(d) is a top view of the first and second pulleys taken along the line A in FIG. 5(c);

FIG. 12 is a side elevational view of the first and second pulleys with the wire in a fifth embodiment thereof, taken along the line VII-VII in FIG. 13;

DESCRIPTION OF THE PREFERRED EMBODIMENTS

Figure 1:
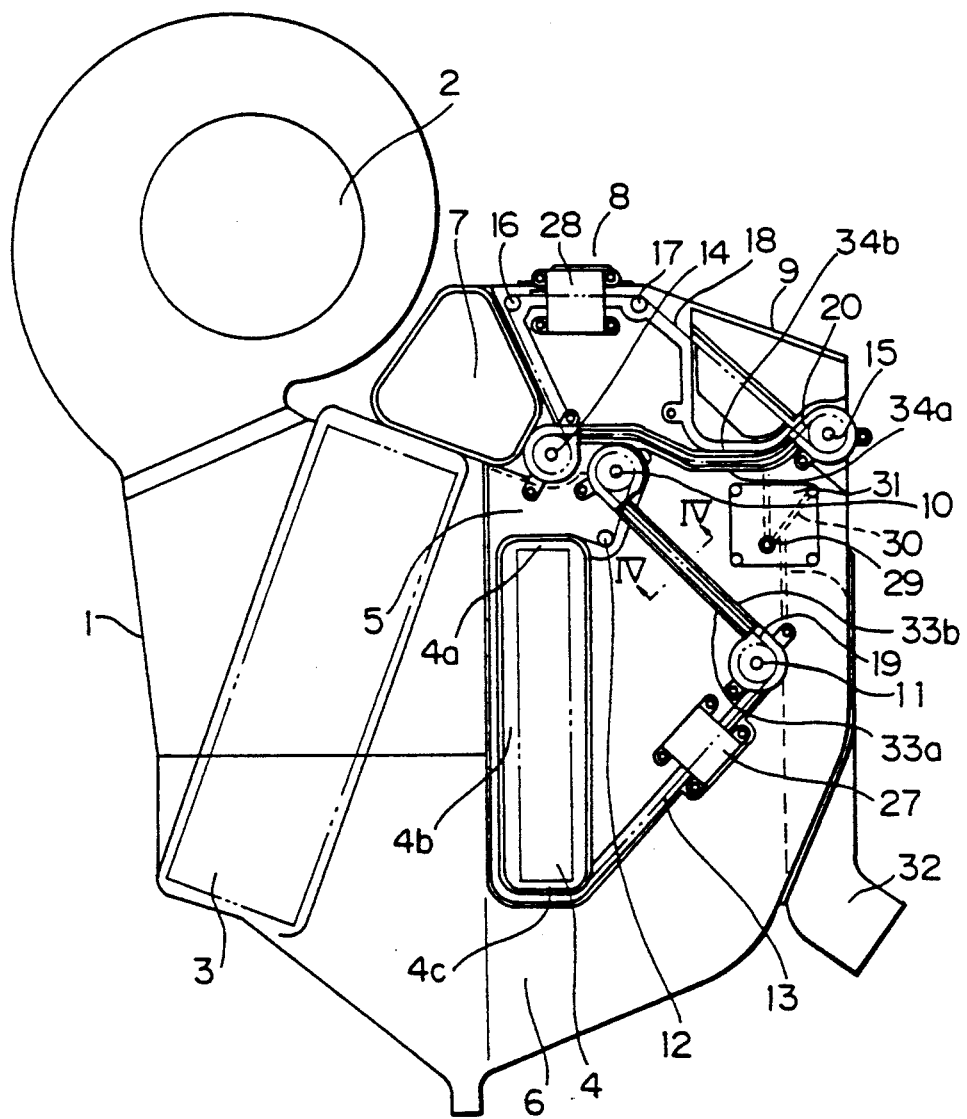
FIG. 1 is a vertical cross sectional view of an air conditioning device for an automobile according to the present invention.

In FIG. 1, showing a general view of an air conditioning device for an automobile according to the present invention, reference numeral 1 denotes an air duct 1 and having blower 2 arranged inside the air duct 1 at the upstream end thereof. An evaporator 3 for cooling the air issued from the blower 2 is connected to the downstream end of the blower 2, and a heter core 4 is arranged downstream of the evaporator 3 substantially midway in the air duct 1, for heating the cooled air from the evaporator 3. The air flow is passed through the evaporator 3 and emitted, via a first passageway 5 or second passageway 6, to a cabin of a vehicle.

The downstream end of the air duct 1 adjacent to the cabin, is provided with a foot outlet 7 open to the cabin at a lower portion thereof, for emitting an air flow directed to a lower portion of a passenger, a defroster outlet 8 open to a cabin such that the air flow therefrom is directed onto the front window of the vehicle, and a face outlet 9 open to the cabin for obtaining an air flow directed to a top portion of a passenger. Noted, the air flow from the foot outlet 7 is directed transversely to the plane of the drawing.

A first shaft 10, which extends transversely to the plane of FIG. 1, is rotatably connected to the duct 1 at a position to the right of and above the heater core 4 in FIG. 1. A second shaft 11, which also extends transversely to the plane of FIG. 1, is also rotatably connected to the duct 1 at the right of the heater core 4 in FIG. 1. A first intermediate shaft 1, which extends transversely to the plane of FIG. 1, is rotatably connected to the air duct 1 at a position downstream of and adjacent to the top end of the heater core 4.

One end of a first film damper 13 is wound around the first shaft 10, and the other end thereof is wound around the second shaft 11. The first film damper 13 is stretched between the first and second shafts 10 and 12, via the first intermediate shaft 12, and an upper side 4a, an upstream side 4b, and a bottom side 4c, of the heater core 4. The first film damper 13 operates as an air mix damper for controlling the degree of the opening of the heater core 4, to thereby control the amount of air passed through the heater core 4 for controlling the temperature of the air after it is mixed with the cooled air that has bypassed the heater core 4. Namely, the larger the degree of the opening of the heater core 4 opened by the first film damper 13, the higher the temperature of the air after mixing. To control the movement of the first damper film 13, the first shaft 10 is operated as a drive shift to wind or unwind the first damper film 13 thereon or therefrom.

A third shaft 14, which extends vertically with respect to the plane of FIG. 1, is arranged at the right, lower side of a foot-directed outlet 7, and is fixed to the air duct 1, and at the right, lower side of the face-directed outlet 9, a fourth shaft 15, which extends transversely to the plane of FIG. 1, is fixed to the air duct 1. At the boundary between the foot-directed outlet 7 and the defroster outlet 8, a rotatable, second intermediate shaft 16, which extends transversely to the plane of FIG. 1, is connected to the air duct 1, and at the boundary between the defroster outlet 8 and the face-directed outlet 9, a rotatable, third intermediate shaft 17, which extends transversely to the plane of FIG. 1, is connected to the air duct 1.

A first end of second film damper 1 made of flexible film is connected to and wound in the third shaft 14, and the second end thereof is connected to and wound on the fourth shaft 15. The second film damper 18 is arranged between the third and fourth shafts 14 and 15, via the second intermediate shaft 16 and the third intermediate shaft 17.

Figure 2:
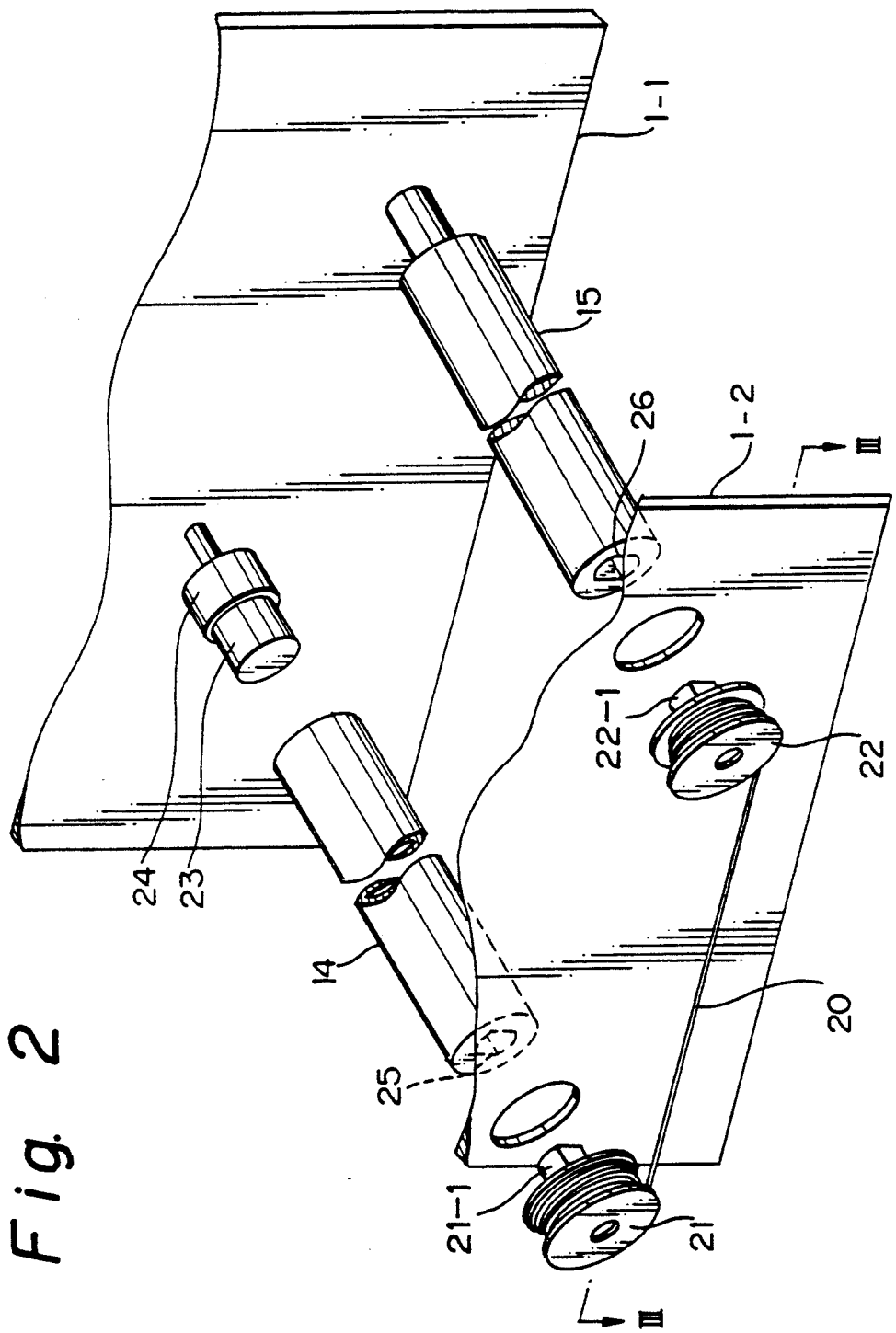
FIG. 2 is a schematic perspective view of the third and fourth shafts shown in FIG. 1.

Reference numeral 19 denotes a first wire having a first end thereof connected to and wound on a first tapered pulley 21 in FIG. 2 (not shown in FIG. 1, to simplify the drawing) connected to the first shaft 10, and a second end thereof connected to and wound on a second tapered pulley 22 in FIG. 2 (not shown in FIG. 1, to simplify the drawing) connected to the second shaft 11. Similarly, a first end of a second wire 20 is connected to and wound on a first tapered pulley 21 (not shown in FIG. 1, to simplify the drawings connected to the third shaft 14, and a second end thereof is connected to and wound on a second tapered pulley (not shown in FIG. 1, to simplify the drawing) which is connected to the fourth shaft 14.

Figure 3:
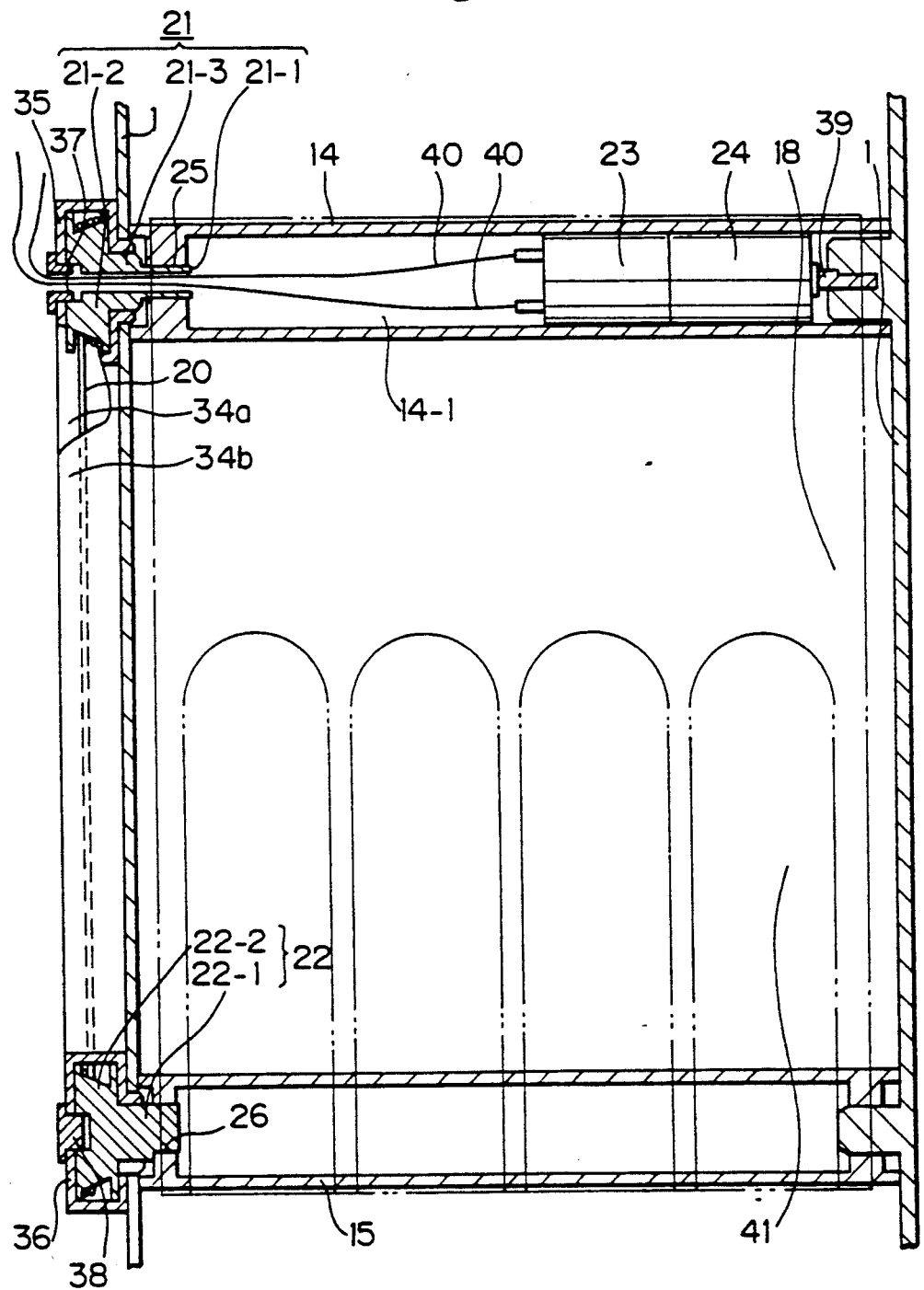
FIG. 3 is a horizontal cross sectional view taken along the line III—III in FIG. 2.

FIG. 2 illustrates the connection of the second wire 20 to the first and second pulleys 21 and 22. In FIG. 2, the film damper is omitted, for simplicity. Furthermore, the same construction is substantially employed for the connection of the first ire 19 to the pulleys on the first and second shafts 10 and 11. In FIG. 2, the air duct 1 is provided with facing wall portions 1—1 and 1—2, to which the third and the fourth shafts 14 and 15 are rotatably connected. The third and fourth shafts 14 and 15 are formed as hollow shafts. As shown in FIG. 3, a direct current (DC) electric motor 23 generating a rotational movement for driving the third shaft 14, and a speed reduction gear 24 for reducing the rotational movement obtained by the motor 23 are arranged inside the third shaft 14 serving as a drive shaft.

Also, shown in FIG. 2, one end of the third shaft 14, near the wall portion 1-2, is provided with a first bore 25 having a rounded rectangular cross sectional shape with a pair of straight sides connected by a pair of outwardly-convexed sides. The first tapered pulley 21 has a stub shaft portion 21-1 naving a rounded rectangular cross sectional shape, which is sealingly inserted, via the wall portion 1-2 of the air duct 1, to the bore 25 so that the first pulley 21 —nd the shaft 14 are fixed with each other, and accordingly, the first pulley 21 is rotated together with the third shaft 14. Similarly, one end of the fourth shaft 1, near the wall portion 1-2, is provided with a second bore 26 having a rounded rectangular cross sectional shape with a pair of straight sides connected by a pair of outwardly-convexed sides. The second tapered pulley 22 has a stub shaft portion 22-1 having a rounded rectangular cross sectional shape, which is sealingly inserted, via the wall portion 1-2 of the duct 1, to the bore 26 so that the second pulley 22 and the fourth shaft 15 are fixed to each other, and accordingly, the pulley 22 is rotated together with the fourth shaft 15.

As shown in FIG. 3, the first and second pulleys 21 and 22 have axial truncated conical shape portions 21-2 and 22-2, respectively, and on each of the truncated conical shape portions 21-2 and 22-2 a continuous spiral shaped groove is formed for accommodating the wire 20 when wound thereon. The arrangement of the truncated conical shape portions 21-2 and 22-2 of the first and the second pulleys 21 and 22 along the axes of the third and the fourth shafts 14 and 15, respectively, is such that, for the first pulley 21, the nearer to the shaft 14 the truncated conical portion 21-2, the larger the diameter of the portion 21-2, and for the second pulley 22, the nearer to the shaft 15 the truncated conical portion 22-2, the small the diameter of the portion 22-2.

In FIGS. 2 and 3, a first end of the second wire 20 is connected to the first pulley 21 at a position on the helical groove on the truncated conical shaped portion 21-2 of the pulley 21 near the third shaft 14, and a second end thereof is connected to the second pulley 22 at a position on the helical groove on the truncated conical shaped portion 22-2 of the pulley 22 near the fourth shaft 15. As a result, the wire 20 can be wound onto the first or the second tapered pulley 21 or 22.

Now, the operation of the first embodiment as described above will be explained. FIGS. 5-(a) to (d) schematically illustrate the relationships between the amount of second film damper 18 wound on the third shaft 14 and the amount of second wire 20 wound on the first tapered pulley 21, and between the amount of second film damper 18 wound on the fourth shaft 15 and the amount of second wire 20 wound on the second tapered pulley 22. Specifically, FIGS. 5-(a) and (c) schematically illustrate how the second film damper 18 is wound on the third shaft 14 and fourth shaft 15, respectively. In FIGS. 5-(a) and (c), the second wire 20 and the first and second tapered pulleys 21 and 22 are omitted, for simplicity. Contrary to this, FIGS. 5-(b) and (d) illustrate the first tapered pulley 21 when connected to the third shaft 14, the second tapered pulley 22 when connected to the fourth shaft 15, and the second wire 20, when viewed along line A in FIGS. 5-(a) and (c), respectively. In FIGS. 5-(a) to (d), d is a radius of the third and fourth shafts 14 and 15, and t is a thickness of the second film damper 18 wound on the third or fourth shaft 14 or 15.

In FIG. 5-(a), wherein the amount of the second film damper 18 wound on the third shaft 14 is larger than that wound on the fourth shaft 15, a "foot" mode is obtained, wherein the second film damper 18 is located such that the opening 18A thereof is aligned with the foot-directed opening 7, while at the same time, the film damper 18 closes the face-directed opening 9. In this foot mode position of the second film damper 18, the amount of the second wire 20 wound on the second tapered pulley 22 is larger than that wound on the first tapered pulley 21.

In the foot mode position as shown in FIG. 5-(a), where the opening 18A is aligned with the foot outlet 7, the thickness of the second damper film 18 wound on the third shaft (drive shaft) 3 is t, and the second wire 20 is located at the maximum radius of $d+t$ of the truncated conical shape portion of the pulley 21 connected to the third shaft 14. Namely, the radius of the third shaft 14, including the thickness of the film damper 18 wound thereon, is the same as the radius of the truncated conical shape on which the wire 20 is located. Note, in the foot mode position as shown in FIG. 5(b), the film damper 18 is merely connected to the fourth shaft (driven shaft) 15 and is not substantially wound on the fourth shaft 15, while the wire 20 is wound along the entire axial length from the portion of the maximum diameter $d+t$ to the portion of the minimum diameter d from which the wire 20 extends to the maximum diameter portion of the first pulley 3.

FIG. 5-(c) shows the face-outlet mode where the opening 18A is aligned with the face-outlet 9. In this mode, the second film damper 18 is connected only to the third shaft (drive shaft) 3, so that the thickness of the film 18 on the shaft 14 having a radius d is substantially zero, while the second wire 20 is wound along the full axial length from the portion of the maximum diameter d+t to the portion of the minimum diameter d, from which the wire extends to the second pulley 22. Note, in the face mode position, as shown in FIG. 5(c), the film damper 18 is fully wound on the fourth shaft (driven shaft) 15 to the thickness t, while the wire 20 from the first pulley 21 is connected only to the second shaft 22 at the portion thereof having the maximum diameter d+t.

To move the film damper 18 from the position of FIG. 5-(a) to the position of FIG. 5-(c), the third shaft 14 is rotated clockwise for one complete rotation, from the position shown in FIG. 5-(a), so that the second film damper 18 is unwound for a length of about $2\pi(d+t)$. In the prior art construction, wherein both the first and the second pulleys are cylindrically shaped and are connected to each other by a belt, one complete rotation of the third shaft 14 in a clockwise direction will cause the fourth shaft 15 to be rotated by one complete rotation in a clockwise direction. The one complete rotation of the fourth shaft 15 causes the second film damper 18 to be wound thereon for an amount of about $2\pi d$, and this causes the difference between the amount of second film damper 18 unwound from the third shaft 14 and the amount of second film damper 18 wound up by the fourth shaft to be about $2\pi(d+t)-2\pi d=2\pi t$, which causes a slackening of film damper 18 between the third and the fourth shafts 14 and 15.

In the first embodiment of the present invention, as explained above, upon one complete rotation of the third shaft 14, serving as a drive shaft, in the clockwise direction, for unwinding the second film damper 18 for a length of about $2\pi(d+t)$, the fourth shaft 15 winds up the second film damper 18 for a length of about $2\pi(d+t)$, and thus any slack in the second film damper between the third and the fourth shafts 14 and 15 is prevented. Namely, one complete rotation of the third shaft 14 in a clockwise direction causes the first tapered pulley 21 connected thereto to be rotated for one complete rotation, which causes the second wire 20 to be wound thereon for the length of about $2\pi(d+t)$, because the radius(d+t) of the first tapered pulley 21 at the position whereat the wire 20 from the second pulley 22 is located is equal to the radius(d+t) of the shaft 14 including the film damper 18 wound thereon. The winding of the second wire for a length of about $2\pi(d+t)$ onto the first tapered pulley 21 causes the second tapered pulley 22 to also be rotated in a clockwise direction by slightly more than one complete rotation, whereby the second wire 20 is unwound for a length of about $2\pi(d+t)$, and thus the fourth shaft 15 is rotated by slightly more than one complete rotation, whereby the second film damper 18 is wound thereon for a length of about $2\pi(d+t)$.

The reason for the rotation of the second tapered pulley 22 by slightly more than one complete rotation is now explained. When the first tapered pulley 21 has the second wire 20 wound thereon for a length of about $2\pi(d+t)$, as mentioned above, the length of the second wire 20 unwound from the second tapered pulley 22 must be about $2\pi(d+t)$, because any difference between the length of the second wire 20 wound by the first tapered pulley 21 and the length of the second wire 20 unwound from the second tapered pulley 22 causes the second wire 20 to be overstretched or made slack. The fourth shaft 15, to which the second pulley 22 is connected, is a driven shaft, and the winding of the second wire 20 onto the first tapered pulley 21 for a length of about $2\pi(d+t)$ causes an unwinding from second pulley 22 of the second wire 20 for a length of about $2\pi(d+t)$. When the second wire 20 is unwound from the second pulley 22 for a length about $2\pi(d+t)$, the fourth shaft is rotated by slightly more than one complete rotation, due to the fact that the radius of the second pulley 22 where the wire 20 is taken out is d.

Since the second pulley 22 is mechanically connected to the fourth shaft 15, upon the rotation of the second tapered pulley 22 in a clockwise direction by slightly more than one complete rotation, for an unwinding of the second wire 20 for a length of about $2n(d+t)$, the fourth shaft 15 is also rotated by slightly more than one rotation in a clockwise direction, which allows the second film damper 18 to be wound thereon for a length of about $2\pi(d+t)$, due to the fact that the radius of the shaft 15 where the film damper 18 is wound is d. The amount of film damper 18 wound up by the fourth shaft 15 is equal to the amount of film damper 18 unwound by one rotation of the third shaft 14, and thus the second film damper 18 is not overstretched or slackened.

The second wire 20 is wound on spiral shaped grooves in the tapered portions of the first and second tapered pulleys 21 and 22, and therefore, during the change of the second film damper 18 from a state shown in FIG. 5-(a) to a state shown in FIG. 5-(c), i.e., during the change of the second wire from the state shown in FIG. 5-(b) to the state shown in FIG. 5-(d), a winding thereof is carried out in accordance with the thickness of the wound up second film damper t, whereby the second film damper 18 is not overstretched or slackened, and a desired tension can be maintained in the second film damper.

To move the film damper 18 from the position in FIG. 5-(c) to the position in FIG. 5(a), the third (drive) shaft 14 is rotated counterclockwise for one complete rotation, from the position shown in FIG. 5-(c), so that the second film damper 18 is unwound for a length of about $2\pi d$. Upon the one complete rotation of the third shaft 14 in the counter clockwise direction, for unwinding the second film damper 18 for a length of about $2\pi d$, the fourth (driven) shaft 15 allows the second film damper 18 to be unwound for a length of about $2\pi d$, and thus no slack occurs in the second film damper between the third and the fourth shafts 14 and 15. Namely, one complete rotation of the third shaft 14 in the counter clockwise direction causes damper film 18 to be unwound from the second pulley 22 for a length of about $2\pi d$, and accordingly, the fourth shaft 15 is rotated by slightly less than one complete rotation in the counterclockwise direction, and thus the second pulley 22 is rotated, by an amount that is slightly less than one complete rotation, in a counterclockwise direction. This causes the wire 20 to be wound onto the second pulley 22 for the length of $2\pi d$, because the radius (d+t) of the fourth shaft 15 including the film damper 18 wound thereon is equal to the radius (d+t) of the second pulley 22 at the position whereat the wire 20 from the first pulley 21 is located. The winding of the wire 20 onto the second pulley 22 for the length of about $2\pi d$ in the counter clockwise direction causes the wire 20 to be unwound from the first pulley 21 for a length of about $2\pi d$, which causes the pulley 21 to be rotated for about one complete rotation because the wire 20 is unwound from the first pulley 21 at a position thereof where the radius is d. As a result, no difference exists not only between the length of the damper film 18 unwound from the third shaft 14 and the length of the film wound up by the fourth shaft 15, but also between the length of the wire 20 wound up by the second pulley 22 and the length of the wire 20 unwound from the first pulley 21. As a result, neither the film damper 18 nor the wire 20 are overstretched or slackened.

The above explanation is directed to the operation of the second film damper 18 when moved between the foot-directed outlet port 7 and the face-directed outlet port 9 along the third shaft 14 connected to the first tapered pulley 21 and the fourth shaft 15 connected to the second tapered pulley 22. The same operation is also carried out for moving the first film damper 13 along the first shaft 10 connected to the first tapered pulley 21 and second shaft 11 connected to the second tapered pulley 22, and thus a detailed explanation thereof will be omitted.

As is clear from the above, upon the rotation of the drive shaft 14 for unwinding the film damper 18 thereon toward the driven shaft 15, the amount of film damper 18 unwound per one rotation of one of the shafts and the amount of film damper 18 wound up on the other shaft, and the amount of the wire wound up on one of the tapered pulleys 21, 22 and the amount of the wire unwound from the other of the tapered pulley 21, 22 are always equal to each other, regardless of the thickness of the damper film wound on the shafts. As a result, no slacking or overtightening of the damper film or wire occurs.

Returning to FIG. 1, the first film damper 13 is provided with a row of evenly-spaced fine holes (not shown), along the direction of the movement thereof. These holes are detected by a first photo interrupter 27, for detecting the position of the first film damper 13 along the direction of movement thereof. The first interrupter 27 is constructed from a pair of photo interrupting elements, the spacing of which is 1.5 times that of the spacing between the adjacent detecting holes on the first film damper 13. Furthermore, these two photo interrupter elements are formed as a squared C shape, and are fixedly connected to the duct 1 so that they face each other via the detected holes in the first film damper 13. A movement of the first film damper 13 causes the two photo interrupter elements to alternately detect the detection holes in the first film damper 13, to thereby output signals to a microcomputer (not shown) for a detection of the position of the film damper 13.

The second film damper 18 is also provided with a row of fine detection holes (not shown) along the direction of the movement thereof. These holes are detected by second photo interrupter 28 for detecting the position of the second film damper 18 along the direction of movement thereof. The second photo interrupter 28 is constructed from two photo interrupter elements, the spacing of which is equal to 1.5 times that of a spacing between the adjacent fine detection holes in the second film damper 18 along the direction of movement thereof. Similarly, the two photo-interrupter elements are formed as a squared C shape, and are fixedly connected to the duct 1 to face each other via the detection holes in the second film damper 18. A movement of the second film damper 18 causes the two photo interrupter elements to alternately detect the detection holes in the second film damper 18, to thereby output signals to a microcomputer (not shown) for a detection of the position of the second film damper 18.

A cool air bypass damper shaft 29, which extends vertically with respect to the plane of the drawing, is rotatably supported by the air duct 1. One end of a cool air bypass damper 30 is connected to the cool air bypass damper shaft 29, and a servo motor 31 is connected to the cool air bypass damper shaft 29 for imparting a rotational movement thereto, to thereby obtain an opening or closing movement of the cool air bypass damper 30. Furthermore, the conditioned air is partly emitted from the rear-cabin foot outlet 32 toward the legs of a passenger on a rear seat in the cabin.

Figure 4:
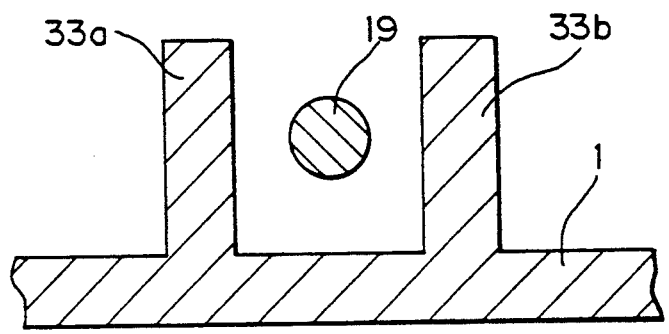
FIG. 4 is a cross sectional view taken along the line IV—IV in FIG. 1.

Referring to FIG. 4, which is a cross sectional view taken along a line VI—VI in FIG. 1, the air duct 1 is provided with a pair of spaced-apart, integral raised portions 33a and 33b, and the first wire 19 is extended therebetween. Similarly, a pair of spaced-apart raised portions 34a and 34b, having similar shapes to those of the portions 33a and 33b, are formed integrally with the air duct 1, and the second wire 20 is extended therebetween.

In FIG. 3, which is a cross sectional view taken along a line III-III in FIG. 2, the second film damper 18, and the second raised portions 34a and 34b not shown in FIG. 2, are shown. Also, first and second covers 35 and 36, first and second caps 37 and 38, and an electric supply cable 40, described later, are shown. As shown in FIG. 3, the third shaft 14 is a hollow shaft having a space 14-1 therein for holding the DC motor 23 and the speed reduction gear 24, which is connected to the DC motor 23. The DC motor 23 and the speed reduction gear 24 are constructed as one body. Furthermore, an outer housing of the speed reduction gear 24 is tightly inserted to the hollow third shaft 14, so that it is in contact with the inner wall thereof. The speed reduction gear 24 has an output shaft 39 having a cross sectional substantially D shape, which is inserted into a bore having a complimentary shape and formed in a boss portion 1-3 of the air duct 1, so that a rotation of the output shaft 39 caused by a rotation of the output shaft of the motor 23 causes the casing of the motor 23 itself to be rotated together with the third shaft 14, with respect to the air duct 1. Namely, the arrangement of the DC motor 23 together with the reduction gear 24 inside the shaft 14 is sufficient to obtain a rotational movement thereof. Power supply cables 40 are extended from the DC motor 23 to the outside of the shaft 14, via the first tapered pulley 21, to a control circuit (not shown).

Note, the first tapered pulley 21 is provided with a boss 21-3 rotatable with respect to the air duct 1, from which the shaft 21-1 extends. The shaft 21-1 is fixedly inserted into a bore 25 formed at the end of the third shaft 14 near the tapered pulley 21, and as a result, the rotation of the third shaft 14 is transmitted into the first pulley 21. The second tapered pulley 22 is provided with a boss 22-1 rotatable with respect to the air duct 1, which is fixedly inserted into a bore 26 formed at the end of the fourth shaft 15 near the pulley 22. As a result, the rotation of the second tapered pulley 22, transmitted from the first pulley 21 via the second wire 20, is transmitted to the fourth shaft 15.

A first cover 35 protecting of the first tapered pulley 21 is connected to the air duct 1 so that it houses the first tapered pulley 21, and a second cover 36 protecting the second tapered pulley 22 is connected to the air duct 1 so that it houses the second tapered pulley 22. A first cap 37 having a central bore therethrough is fitted to the first cover 35, to allow the wires 40 from the DC motor 23 to be taken to the outside via the bore, and a second cap 38 is fitted to the second cover 36.

The first and second shafts 10 and 11 have substantially the same inner construction as that of the third and fourth shafts 14 and 15 described above with reference to FIG. 3, and therefore, a detailed explanation thereof will be omitted.

In the above embodiment, the first and second tapered pulleys 21 and 22 having truncated conical portions are oppositely tapered so that the speed of the movement of the film damper between the opposite shafts is always substantially equal to the speed of the movement of the wire between the first and second tapered pulleys 21 and 22, regardless of the thickness of the film damper 18 wound on the shafts, which prevents a slackening or stretching of not only the film damper 18 but also the wire 20. Furthermore, the provision of the helical groove on the first and second tapered pulleys 21 and 22 is preferable, to thus obtain a correct winding or unwinding of the wires 19 and 20 by the first tapered pulley 21 connected to the drive shafts 10 and 14.

In the above embodiment, the means for detecting the position of the film damper 13 or 18, are directly provided on the film damper, and are detected by a pair of photo interrupters, to thereby make it possible for the film damper to be stopped at a precise location.

In the first embodiment, the first shaft 10 and the third shaft 14, as the respective drive shafts, are each provided therein with DC motors 23 and reduction gears 24, which reduces the size of the air conditioning device.

Figure 6:
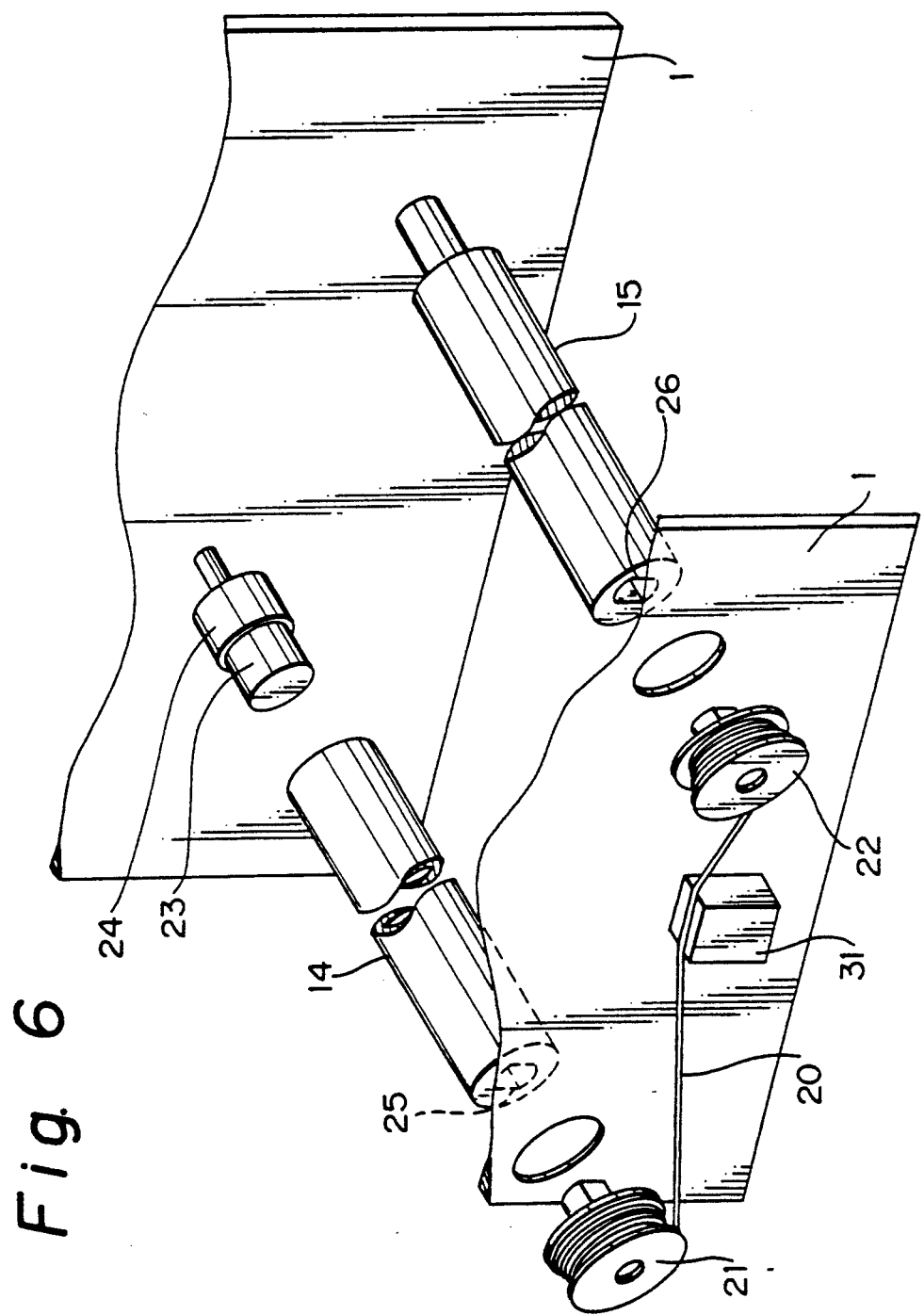
FIG. 6 is similar to FIG. 2, but is directed to another embodiment.

FIG. 6 illustrates a second embodiment of the present invention, wherein a servomotor 31 is arranged between the first and second tapered pulleys 21 and 22; the wire 20 being arranged to bypass the servomotor 31.

Figure 7:
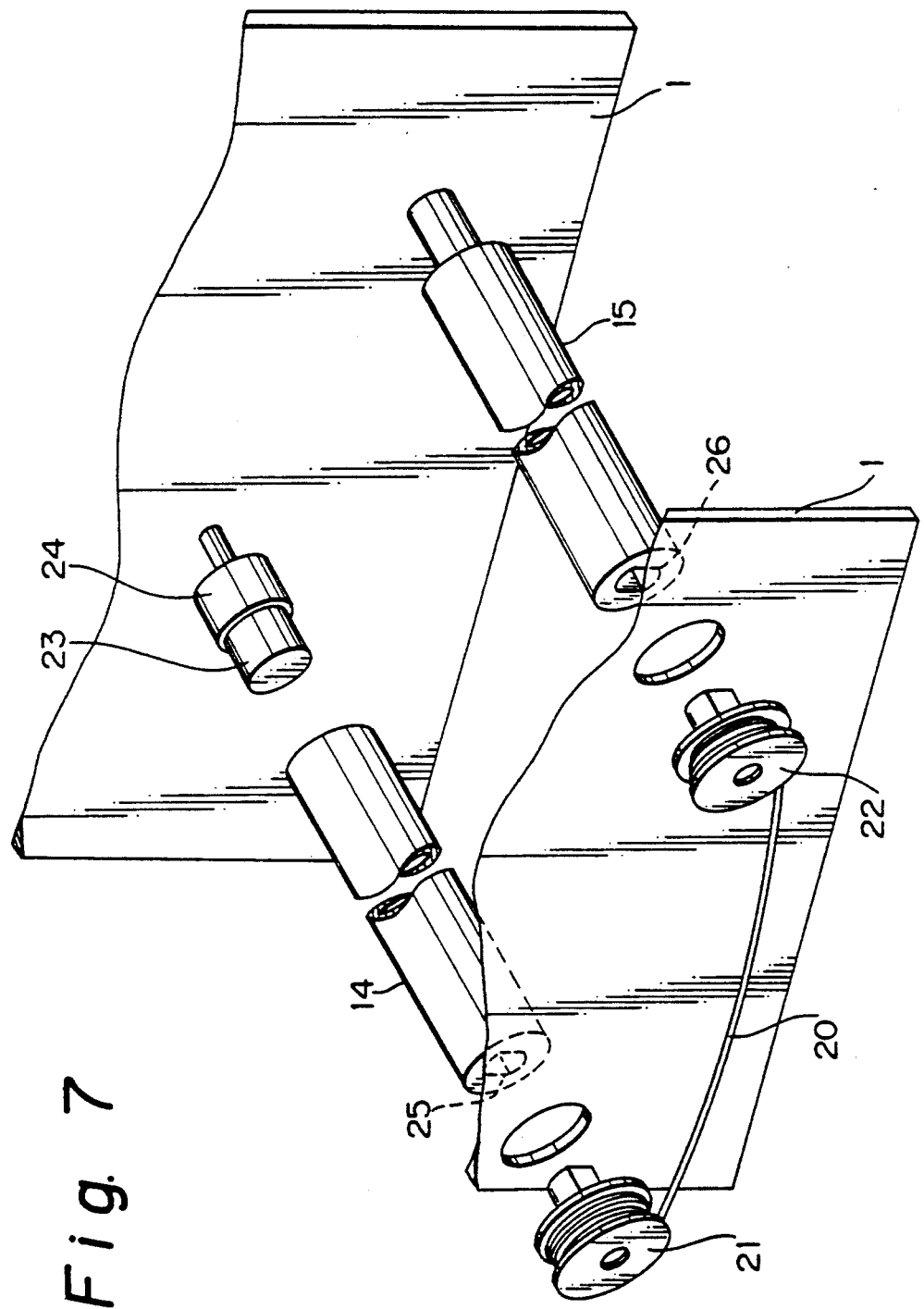
FIG. 7 is similar to FIG. 2, but illustrates a problem to be solved by the second embodiment.

The problem to be solved by the third embodiment will be explained with reference to FIG. 7, which is similar to FIG. 2 of the first embodiment. The air duct 1, when made of a plastic material, is subjected to a thermal deformation in accordance with seasonal changes in the atmospheric temperature, and this thermal deformation causes a distance between the third and fourth tapered pulleys 21 and 22 to be changed. When the air duct 1 is thermally shrunk, the distance between the tapered pulleys 21 and 22 is shortened, and thus the second wire 20 becomes slack. The slack in the second wire 20 can sometimes cause the second wire 20 to be disengaged from the spiral grooves on the respective first and second pulleys 21 and 22, and thus prevents the second wire 20 from being precisely wound or unwound. As a result, the second wire 20 cannot maintain a desired control of the speed of the first and second shafts 21 and 22 in accordance with changes in the thickness of the second film damper 18.

Note, when assembling the air conditioning device, the first and second pulleys 21 and 22 are first connected to the third and fourth shafts 14 and 15, respectively, and the wire 20 is then looped around the first and second pulleys 21 and 22 in such a manner that the second wire 20 is not under a strong tension, which otherwise would cause an increase of the drive power to the device regardless of a relatively small power output by the DC motor 23. As a result, in the assembled state, the second wire 20 must be placed under a mild tension, so that a small operating force is sufficient to drive the device. As a result, the second wire 20 must be looped around the first and second pulleys 21 and 22 at a relatively low tension, leaving it slightly slack. The thermal deformation of the air duct 1, therefore, can cause an excessive loosening of the wire 20 and a subsequent disengagement thereof from the respective pulleys 21 and 22.

Figure 9:
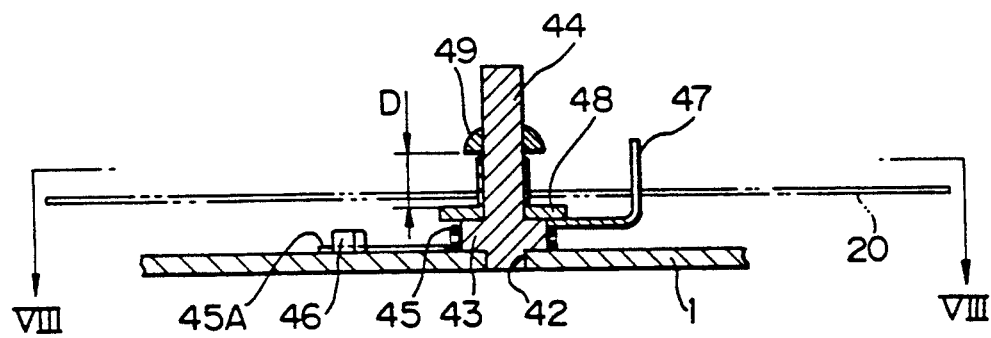
FIG. 9 is a cross sectional view taken along the line IX—IX in FIG. 8.
Figure 8:
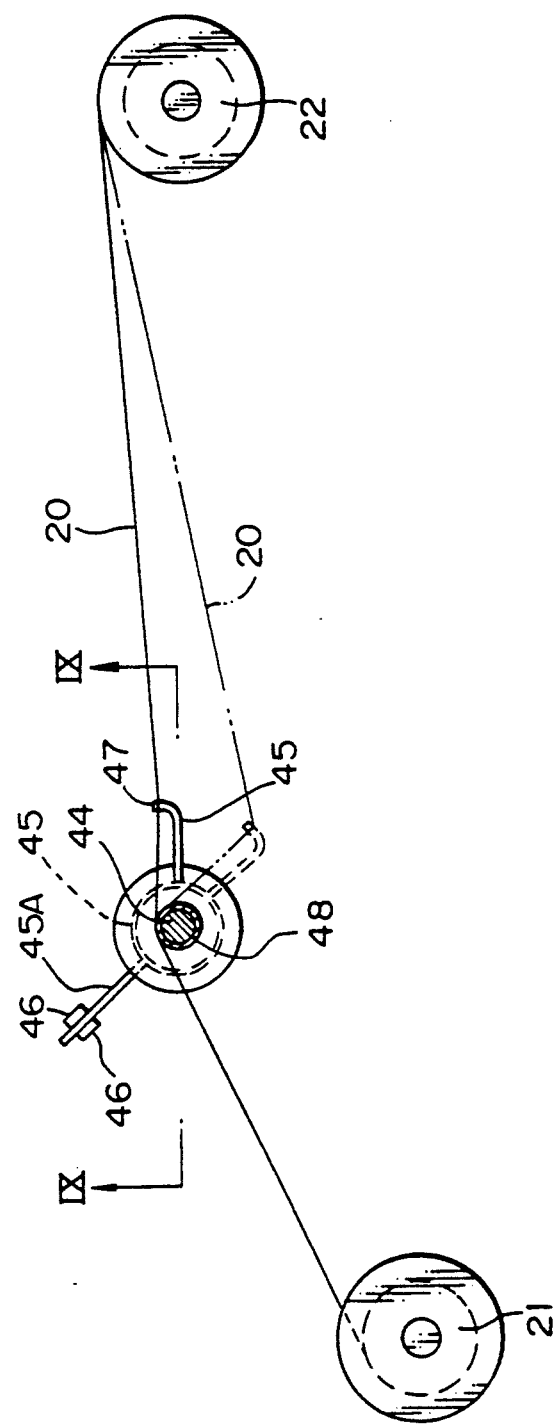
FIG. 8 is a side elevational view of the first and second pulleys with the wire in a third embodiment thereof, taken along the line VIII-VIII in FIG. 9.

In the third embodiment between the first tapered pulley 21 and the second tapered pulley 22, there is provided a spring means for imparting the second wire 20 with a predetermined tension, and an abutment means for imparting the tension of the spring means directly to the second wire 20 as shown by FIGS. 8 and 9. As shown in FIG. 9, the air duct 1 is provided with an opening 42 between the first and second pulleys 21 and 22, and a pin 44 extending parallel to the first and second pulleys 21 and 22 is inserted to this opening 42. The pin 44 is formed with an annular flange portion 43 which rests on the air duct 1, and a coil spring 45 is arranged about the flange portion. The coil spring 45 has a first end 45A which engages with a pair of spaced stoppers 46 integrally formed on the air duct 1, so that the end 45A is sandwiched between the stopper portions 46, and a second bent end 47 extending parallel to the pin 44. A bush 48 having a flange at the bottom thereof is then inserted to the pin 44 so that the coil spring 43 is held between the flange portion of the bush 48 and the air duct 1. Finally, a stopper 49 is inserted to the pin 44 for fixing the bush 48 to the pin 44 while maintaining the bush 48 in a freely rotatable state on the pin 44.

In the assembled state as shown in FIG. 8, the second wire 20 is arranged between the first and second pulleys 21 and 22 such that the second wire 20 is in contact with the sleeve 48 and the coil spring 45, at the lower side of the bent portion 47 thereof. Thus, at the portion 47, the spring 45 generates a spring force in the clockwise direction about the axis of the pin 44 in FIG. 8, so that the bent portion 47 of the spring 45 urges the wire 20 in the clockwise direction, which imparts a tension to the wire 20. When the wire 20 has little slack, a displacement of the wire at the location in contact with the bent portion 47 is small, as shown by the solid line. Contrary to this, when the wire 20 has a large amount of slack, the force of the spring 45 at the bent portion 47 causes the wire 20 to be displaced downward, as shown by a phantom line in FIG. 8, to impart a suitable tension to the wire 20. As a result, the wire 20 is always under a suitable tension, regardless of the thermal conditions, and thus is not liable to be accidentally disengaged from the helical grooves of the pulleys 21 and 22.

When winding the film damper between the third and fourth shafts 14 and 15, to move the film damper between the foot outlet position in FIG. 5-(a) and the face outlet position in FIG. 5-(c), the second wire 20 is displaced along the length of the pin 44 in FIG. 9, between the position as shown in FIG. 5-(b) and the position as shown in FIG. 5-(d), because the wire 20 is wound on or unwound from the helical groove of the tapered portion of the tapered pulley 21 and 22. When a distance D between the opposing faces of the flange of the bush 48 and the stopper 49 is too small, during the displacement of the wire 20 along the pin 44 for changing the air conditioning mode, the wire 30 may come into contact with the bush 48 or the stopper 49 and be bent. If the wire 20 is bent, it will be obliquely engaged with the tapered pulley 21 or 22, and thus the wire 20 will be disengaged from the helical groove thereof.

According the embodiment of FIGS. 8 and 9, a sufficient distance D is maintained between the bush 48 and stopper 49, which prevents a contact of the wire 20 therewith, and as a result, the wire 20 is always firmly engaged with the grooves of the first and second pulleys 21 and 22. Thus, the third embodiment as described above is provided with a means for generating a suitable tension in the wire, and with a means for providing a bending thereof between the first and second pulleys, which effectively prevents the wire from being disengaged from the grooves of the first and second pulleys 21 and 22. As a result, a precise speed control of the third and fourth shafts 14 and 15 is obtained in accordance with the change in the amount of the film damper 18 during a winding thereof, and no slack occurs in the film damper 18.

Note, in the third embodiment of FIGS. 8 and 9, the force from the coil spring 45 applied to the second wire 20 is lower than 100 g, and thus only a small force is required for operating the third and fourth shafts 14 and 15 connected to the first and second tapered pulleys 21 and 22, which allows a lowering of the power required for the DC motor 23.

Furthermore, the rotatable bush 48 arranged between the second wire 20 and the pin 44 reduces the frictional force generated when the wire 20 is moved from the state shown by the solid line to the state shown by the phantom line.

Figure 10:
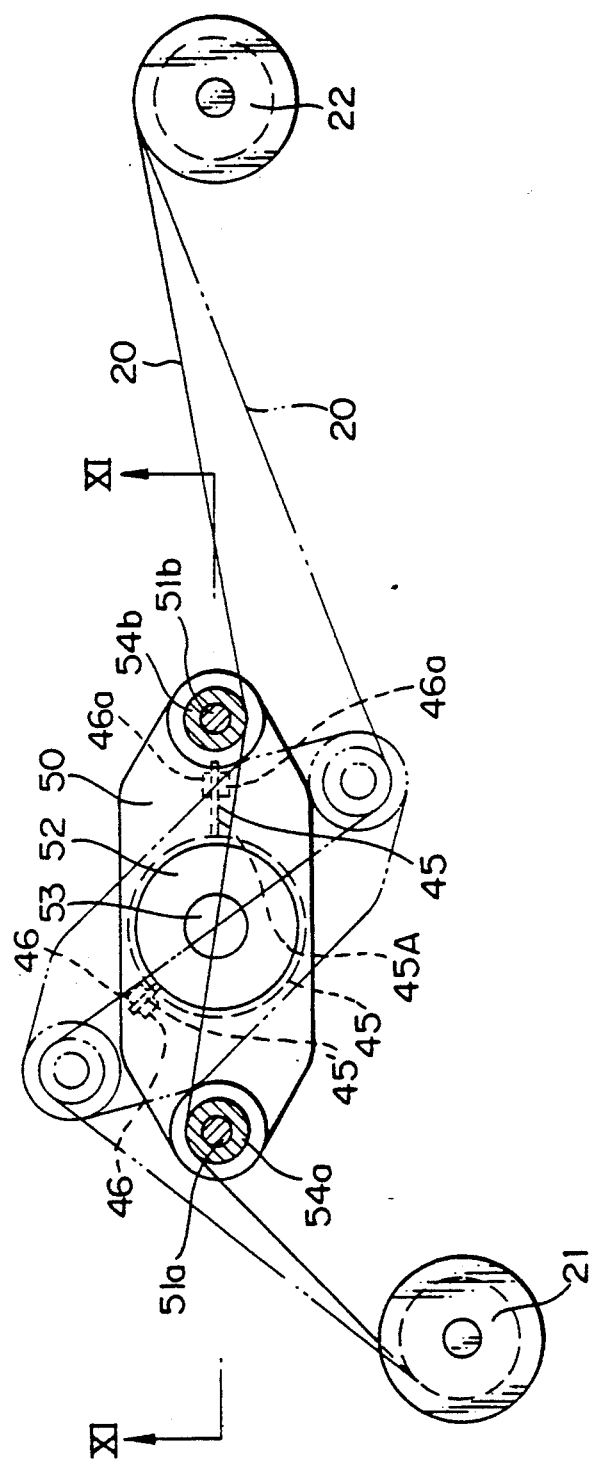
FIG. 10 is a side elevational view of the first and second pulleys with the wire in a fourth embodiment thereof, taken along the line X—X in FIG. 11.
Figure 11:
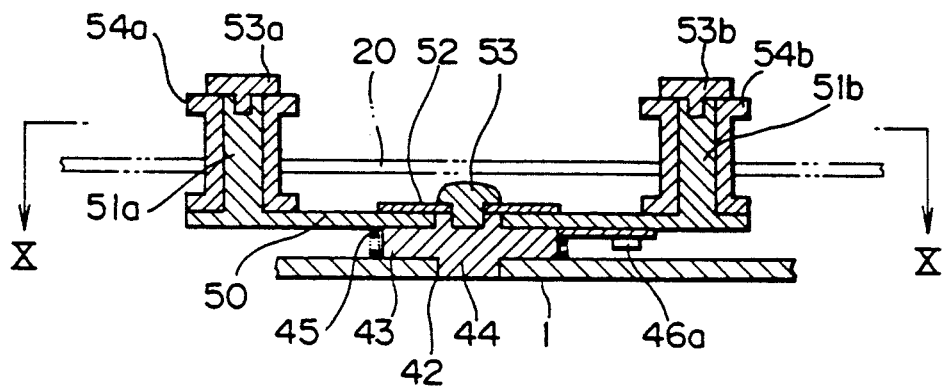
FIG. 11 is a cross sectional view taken along the line XI—XI in FIG. 10.

FIGS. 10 and 11 illustrate a fourth embodiment wherein, as in the third embodiment of FIGS. 8 and 9, the air duct 1 is provided with an opening 42 to which a pin 44 with an annular flange 43 is inserted until the flange 43 thereof abuts against the air duct 1. A coil spring 45 is arrange around the annular flange 43, and has a first end 45, fixed between a pair of spaced-apart projections 46 (FIG. 10) which are an integral part of the air duct 1, and a second end 45A. A lever 50 has a central opening which is inserted to the pin 44 so that the lever 50 abuts against the flange 43 as shown in FIG. 11. A screw 53 is screwed into the top end of the pin 44, via a washer 52, to prevent the lever from being withdrawn, and the lever 50 is rotatable about the pin 44. The bottom surface of the lever 50 has a pair of spaced-apart projections 46a, between which the second end 45A of the spring 45 is fixed. The lever 50, as shown in FIG. 10, has diametrically oppositely extended portions on which a pair of integral pin portions 51a and 51b are formed such that these portions 51a and 51b extend in parallel with respect to the axis of the shafts 14 and 15. Guide sleeves 54a and 54b are inserted to the respective pin portions 51a and 51b, and then respective screws 53a and 53b are screwed to the top ends of the pin portions 51a and 51b, respectively, to prevent the guide sleeves 54a and 54b from being withdrawn while being rotatable thereon.

A second wire 20 is arranged such that it is in contact with the guide sleeve 54a at the top surface thereof, and is also in contact with the guide sleeve 54b at the bottom surface thereof. Thus, the spring 45 generates a force in the clockwise direction about the axis of the pin 44 in FIG. 10, so that the lever 50 urges the wire 20 in a clockwise direction, to impart a tension to the wire 20. When the wire 20 has little slack, a displacement of the wire at the location thereof in contact with the bent portion 47 is small, as shown by the solid line. Contrary to this, when the wire 20 has a large amount of slack, the force of the spring causes the lever 50 to be rotated in a clockwise direction, to a position shown by a phantom line, so that the wire 20 is largely displaced, as shown by a phantom line, to thus impart a suitable tension to the wire 20.

As will be easily seen from FIG. 11, similar to the embodiment of 8 and 9, both of the guide sleeves 54a and 54b have a sufficient length in the direction of the axis of the pins 51a and 51b that, during the winding or unwinding movement of the wire 20 by the first and second pulleys 21 and 22, for selecting a desired outlet for the flow of conditioned air, the wire 20 can be displaced in that direction without touching the top or bottom flanges of the guide sleeves 54a and 54b, to prevent the wire 20 from being bent, which otherwise would cause the wire 20 to be disengaged from the respective spiral grooves of the first and second pulleys 21 and 22.

As explained above, in the fourth embodiment also, the provision of the means for obtaining a desired tension in the wire 20, as well as the provision of the means for preventing the wire 20 from being bent, effectively prevents the second wire 20 from being disengaged from the first and second pulleys 21 and 22, and as a result, a desired control of the speed of the third and fourth shafts 14 and 15 connected to the first and second pulleys 21 and 22, respectively, can be obtained in accordance with a change in the thickness of the second film damper, to thereby maintain a desired tension on the second film damper 18.

Furthermore, the contact of the wire 20 with the rotatable guide sleeves 54a and 54b on the pins 51a and 51b, respectively, reduces the frictional force generated between the wire 20 and the guide sleeves 54a and 54b when the wire 20 is displaced from the position shown by the solid line to the position shown by the phantom line.

Figure 13:
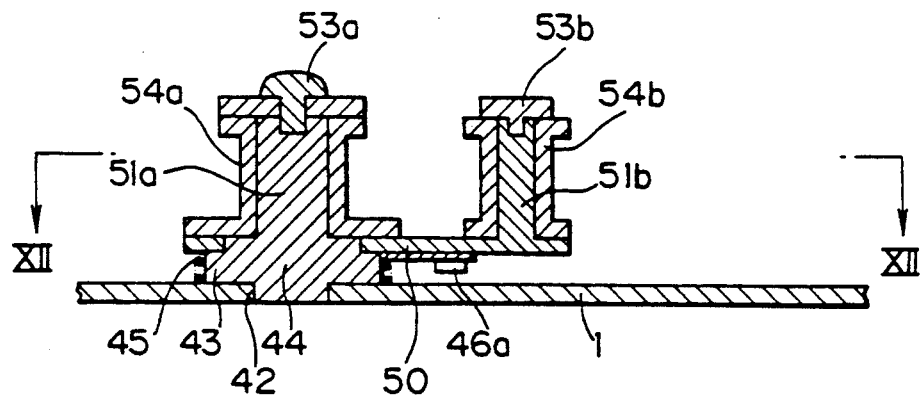
FIG. 13 is a cross sectional view taken along the line XIII—XIII in FIG. 12; and, FIGS. 14-(a) to (d) schematically illustrate various patterns of the arrangement of the film damper and the wire.

FIGS. 12 and 13 illustrate a fifth embodiment wherein the guide sleeve 54a is rotatably mounted on a pin 51a fixed to the air duct 1, and the sleeve 54b is rotatably mounted on the pin 51b fixed to the lever 50, which is rotatably connected to the pin 44. Namely, between the guide sleeves 54a and 54b, only the guide sleeve 54b can be displaced in accordance with the tension in the wire 20. That is, the spring 45, which is engaged at one end 45' with the stoppers 46, and connected to the lever 50 by the stoppers 46a, urges the lever 50 so that it is rotated in a clockwise direction in FIG. 12 about the axis of the pin 44. As a result, the slacker the wire 20, the greater the rotation in a clockwise direction in FIG. 12 of the lever 50, which imparts a desired tension to the wire 20. Furthermore, the width of both of the guide sleeves 54a and 54b between the respective flange ends thereof is sufficient to prevent the wire 20 from coming into contact with the flange ends during the displacement of the wire by the winding and unwinding operation of the damper film when switching the air outlets. As a result, the wire 19 or 20 is prevented from being disengaged from the respective spiral grooves of the pulley 21 and 22, which allows a precise control of the speed of the shafts 10 and 11, or 14 and 15 in accordance with the change in the amount of the film damper 13 or 18 to be obtained, and always prevents slack in the film damper 13 or 18.

The above-mentioned embodiments are basically directed to the operation of the film damper 18 for switching the air outlets, and substantially the same operation can be obtained for the first film damper 13, as the air mix damper.

FIGS. 14-(a) to (d) illustrate several patterns of arrangements of the film damper 13 or 18 and wire 19 or 20 with respect to the first and second pulleys 21 and 22 to which the first or third shaft 10 or 14 as drive shafts, and the second or fourth shafts 11 or 15 as driven shafts, are respectively connected. FIG. 14-(a) corresponds to the embodiment explained with reference to FIGS. 1 to 13, wherein the rotation of the pulley 21 connected to the drive shaft 10 or 14 in the clockwise direction causes the wire 19 or 20 to be wound up on the pulley 21, which causes the pulley 22 to be rotated in the clockwise direction and the wire to be unwound therefrom, thereby causing the film 13 or 18 to be wound up on the shaft 11 or 15, as a driven shaft, which causes the film damper 13 or 18 to be unwound from the shaft 10 or 15. The rotation of the pulley 21 connected to the drive shaft 10 or 14 in the counter clockwise direction causes the damper film 13 or 18 to be wound up on the shaft 10 or 14 connected to the pulley 21, which causes the damper film 13 or 18 to be unwound from the shaft 11 or 15 as a driven shaft, and this causes the second pulley 22 connected to the shaft 11 or 15 to be rotated in the counterclockwise direction, which causes wire 19 or 20 to be wound up on the pulley 22, and causes the wire to be unwound from the first pulley 21, whereby the pulley 21 is rotated in a counterclockwise direction.

In FIG. 14-(b), the film damper 13 or 18 and the wire 19 or 20 are arranged to be crossed twice, but substantially the same operation as that in FIG. 14-(a) is obtained, wherein the rotation of the drive shaft in one direction causes the wire to rotate the driven shaft, to thus wind the damper film onto the driven shaft, and the rotation of the drive shaft in the opposite direction causes the film damper itself to rotate the driven shaft, to thus wind the damper film onto the driven shaft. In FIGS. 14-(c) and (d), the film damper 13 or 18 and the wire 19 or 20 are crossed once, but substantially the same operation can be obtained.

In the above embodiments, the first and second pulleys 21 and 22 are formed as a truncated conical shape, but any other shapes for providing a proportionally changed radius, such as a conical shape, polygonal pyramid or truncated polygonal pyramid, can be employed.

In the embodiments, a wire is employed for a transmission of the power between the pulleys, but other power transmitting means such as a timing belt or chain can be employed.

Furthermore, in place of a DC electric motor for imparting a rotational movement to the drive shaft, any other means can be employed, such as an AC electric motor, ultrasonic motor, stepping motor or even a manual operating system.

Although the embodiments of the present invention are described with reference to the attached drawings, many modifications and changes can be thereto made by those skilled in this art, without departing from the scope and spirit of the present invention.

We claim:

1. An air conditioning apparatus for an automobile, comprising:
    an air duct having one end open to a cabin of the automobile, for generating a flow of air to be introduced into the cabin;
    said air duct defining a pair of opposing walls between which a flow of air passes;
    a blower arranged in the air duct, for generating a flow of air in the air duct;
    means arranged of the blower for controlling a temperature in the air duct;
    means arranged downstream of the blower for controlling a temperature of the air flow, and;
    damper means arranged in the air duct for controlling a condition of the air flow in the air duct, said damper means comprising:
    a pair of spaced-apart shafts each having an axis, and being rotatably with respect to said opposing walls of the air duct;
    a film member having a first end connected to one of said shafts and a second end connected to another of said shafts, said film member having at least one opening through which the air in the air duct is passed, for controlling a condition of the flow of the air in the air duct and having first portion would on the one of said shafts and second portions wound on the other of said shafts;
    drive means for imparting a rotational movement to said one shaft in such a manner that the film member is moved between said spaced-apart shafts by winding or unwinding the film member onto or from said one shaft to which the drive means are connected, and;
    power transmitting means for transmitting the rotation from said one shaft connected to the drive means to the other shaft so that when a radius of said first portion of said film member is smaller than a radius of said second portion, said one shaft rotates at a predetermined rotational speed, and when said radius of said first portion is larger than said radius of said second portion, a rotational speed of said one shaft is substantially less than said predetermined rotational speed, thereby preventing said film member from being over tensioned during transmission of the rotation from said shaft to the other said shaft by said power transmitting means.

2. An air conditioning apparatus according to claim 1, wherein said power transmitting means comprise:
    a first rotating body connected to said one shaft and rotatable in the same direction as said one shaft, the first rotating body having an axis and defining an outer surface having radius which varies proportionally along the axis thereof;
    a second rotating body connected to the other shaft and rotatable in the same direction as said other shaft, the second rotating body having an axis and defining an outer surface having a radius which varies proportionally along the axis thereof, and;
    means connected to both of the first and second rotating bodies and in contact with the respective outer surfaces thereof, for transmitting a rotation of the first rotating body to the second rotating body.

3. An air conditioning apparatus according to claim 2, wherein said transmitting means comprise a wire member having a first end connected to the first rotating body such that the wire member is able to be helically wound on said outer surface of the first rotating body, and a second end connected to the second rotating body such that the wire member is able to be helically wound on said outer surface of the second rotating body, and;
    wherein a ratio of a distance between the axis of the first rotating body and a point whereat said wire member is detached from the first rotating body, to a distance between the axis of the second rotating body and a point whereat said wire member is detached from the second rotating body is equal to a ratio of a radius of the first portion of film member to a radius of the second portion of the film member.

4. An air conditioning apparatus according to claim 3, wherein each of said first and second rotating bodies have a helical groove formed on the respective outer surfaces thereof for receiving the wire member when wound onto the corresponding rotating body.

5. An air conditioning apparatus for an automobile, comprising:

an air duct having one end open to a cabin of the automobile, for generating a flow of air to be introduced into the cabin;

said air duct defining a pair of opposing walls between which a flow of air passes;

a blower arranged in the duct, for generating a flow of air in the air duct;

means arranged downstream of the blower, for controlling a temperature of the air flow, and;

damper means arranged in the duct for controlling a condition of the air flow in the air duct, said damper means comprising:

a pair of spaced-apart shafts each having an axis extending transverse of said opposing walls of the air duct, and being rotatably supported by said opposing walls of the air duct;

a film member having a first end fixedly connected to one of said shafts and a second end connected to the other of said shafts;

said film member having at least one opening through which the air duct is passed, for controlling a condition of the flow of air in the duct;

a first rotating body connected to said one shaft and rotable in the same direction as said one shaft, the first rotating body having an axis coaxial with said one shaft and defining an outer surface having a radius which varies proportionally along an axis thereof;

a second rotating body connected to the other shaft and rotable in the same direction as said other shaft, the second rotating body having an axis coaxial with the other shaft and defining an outer surface having a radius value which varies proportionally along an axis thereof;

a wire member having a first end connected to the first rotating body such that the wire member is able to be helically wound on said outer surface of the first rotating body, and a second end connected to the second rotating body such that the wire member is able to be helically wound on said outer surface of the second rotating body, and;

means for generating a resilient frictional force exerted substantially only in the wire moving between the first and second rotating bodies, to thereby impart a desired tension to the wire and thus obtain a desired engagement of the wire with the first and second rotating bodies.

6. An air conditioning apparatus according to claim 5, wherein said resilient frictional force generating means comprise a tensioning member arranged between the first and second rotating bodies such that the tensioning member is in contact with the wire member moving between the first and second rotating bodies, and spring means for generating a spring force so that a displacement of the tensioning member with respect to the wire in contact therewith is obtained, to thereby create a desired tension in the wire member.

7. An air conditioning apparatus according to claim 6, wherein said tensioning member is in the form of a movable rod able to be engaged with and displace the wire, and wherein said spring means is a coil spring having one end connected to the air duct and a second end formed integrally with said rod.

8. An air conditioning apparatus according to claim 6, wherein said tensioning member is provided with a lever rotatable with respect to the air duct, and a pair of guide pulleys in contact with the wire, at least one of the guide pulleys being mounted on the lever so that a tension is created in said wire when the lever is rotated by the action of the spring means.

* * * * *